(12) United States Patent
Cohen

(10) Patent No.: US 6,412,784 B1
(45) Date of Patent: Jul. 2, 2002

(54) SPLIT FACE MECHANICAL SEAL SYSTEM

(75) Inventor: Edward Isaac Cohen, Severna Park, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/580,211

(22) Filed: May 26, 2000

(51) Int. Cl.[7] .............................................. F16J 15/34
(52) U.S. Cl. ...................... 277/385; 277/405; 277/406; 277/407; 277/937; 277/938
(58) Field of Search ................. 277/379, 403, 277/404, 405, 406, 407, 385, 377, 937, 938

(56) References Cited

U.S. PATENT DOCUMENTS

| | | | |
|---|---|---|---|
| 836,408 A | * 11/1906 | Somes | |
| 2,455,700 A | * 12/1948 | Porges | |
| 2,522,231 A | * 9/1950 | Loftis | |
| 2,736,624 A | * 2/1956 | Schoenrock | |
| 2,985,472 A | * 5/1961 | Schoenrock | |
| 3,190,704 A | * 6/1965 | Guthans | |
| 3,250,539 A | * 5/1966 | Kurz et al. | |
| 3,502,343 A | * 3/1970 | Pustelnik | |
| RE27,188 E | * 10/1971 | Pustelnik | |
| 3,773,337 A | 11/1973 | Adams | |
| 3,822,066 A | * 7/1974 | Keys | |
| 3,926,443 A | * 12/1975 | Fenerty et al. | |
| 3,937,477 A | * 2/1976 | Gyory | |
| 3,969,451 A | * 7/1976 | Floyd et al. | 264/29 |
| 4,036,505 A | * 7/1977 | Flyod et al. | |
| 4,157,187 A | * 6/1979 | Kemp | |
| 4,239,240 A | 12/1980 | Wilkinson | |
| 4,410,188 A | 10/1983 | Copes | |
| 4,515,866 A | * 5/1985 | Okamoto et al. | 428/614 |
| 4,544,610 A | * 10/1985 | Okamoto et al. | 428/611 |
| 4,545,588 A | * 10/1985 | Nagai et al. | |

(List continued on next page.)

OTHER PUBLICATIONS http://www.woodex–meco.com/ (1 p).
http://www.woodex–meco.com/Welcome.html (1 p).

(List continued on next page.)

*Primary Examiner*—Anthony Knight
*Assistant Examiner*—Alison K. Pickard
(74) *Attorney, Agent, or Firm*—Howard Kaiser

(57) ABSTRACT

According to a preferred embodiment, a mechanical face seal assembly comprises four generally ring-shaped members and plural spring devices. The first ring-shaped member is directly fastened (e.g., bolted) to the flanged structural section located at the end of the shaft sleeve. The first and second ring-shaped members are coaxially aligned and rotatively communicative at respective radial surfaces. The first ring-shaped member is made of a metal (or ceramic) matrix composite material. The second ring-shaped member is made of a polymer matrix composite material. The second and third ring-shaped members are mated via radial openings (in the second ring-shaped member) and corresponding radial projections (in the third ring-shaped member). The third ring-shaped member has axial projections and is thereby directly fastened (e.g., bolted) to the fourth ring-shaped member, which clampingly secures the third ring-shaped member with respect to the shaft. The third ring-shaped member contains the spring devices so that they push against the second ring-shaped member, which is consequently biased against the first ring-shaped member. Since each ring-shaped member is a "split" structure having two joinable semicircular halves, the entire sealing system can be installed without disassembling the shafting mechanism. The matrix composite compositions confer structural qualities on the first and second ring-shaped members, and further afford tribological "self-healing" properties of the wear junction therebetween. The resultant benefits include fewer parts, greater compactness, longer service life, and less frequent maintenance and repair.

31 Claims, 7 Drawing Sheets

U.S. PATENT DOCUMENTS

| | | | |
|---|---|---|---|
| 4,576,384 A | | 3/1986 | Azibert |
| 4,605,234 A | * | 8/1986 | Metcalf |
| 4,618,529 A | * | 10/1986 | Yamamura et al. |
| 4,795,169 A | * | 1/1989 | Lowe et al. |
| 4,809,992 A | | 3/1989 | Kemp, Jr. et al. |
| 4,822,056 A | | 4/1989 | Bowers |
| 4,941,669 A | * | 7/1990 | Fujisawa et al. |
| 5,020,809 A | | 6/1991 | Mullaney |
| 5,025,849 A | | 6/1991 | Karmarkar et al. |
| 5,067,733 A | | 11/1991 | Nagai et al. |
| 5,114,163 A | | 5/1992 | Radosav |
| 5,192,085 A | | 3/1993 | McOnie |
| 5,199,720 A | | 4/1993 | Radosav et al. |
| 5,217,233 A | | 6/1993 | Pecht et al. |
| 5,243,836 A | * | 9/1993 | Spring .................. 62/499 |
| 5,292,138 A | | 3/1994 | Glynn et al. |
| 5,337,803 A | | 8/1994 | Divecha et al. |
| 5,354,070 A | | 10/1994 | Carmody |
| 5,389,411 A | | 2/1995 | Cohen |
| 5,409,240 A | * | 4/1995 | Ballard |
| 5,409,241 A | | 4/1995 | Bowers |
| 5,433,906 A | * | 7/1995 | Dasch et al. ................ 264/117 |
| 5,490,682 A | | 2/1996 | Radosav et al. |
| 5,494,634 A | * | 2/1996 | Edelstein et al. ............. 419/12 |
| 5,529,315 A | | 6/1996 | Borino et al. |
| 5,571,268 A | | 11/1996 | Azibert |
| 5,615,893 A | | 4/1997 | Reagan |
| 5,662,340 A | | 9/1997 | Bessette et al. |
| 5,711,532 A | | 1/1998 | Clark et al. |
| 5,716,054 A | | 2/1998 | Duffee et al. |
| 5,725,220 A | | 3/1998 | Clark et al. |
| 5,816,211 A | * | 10/1998 | Atmur et al. |
| 5,820,129 A | | 10/1998 | Reagan |
| 6,000,851 A | | 12/1999 | Cohen |
| 6,062,569 A | * | 5/2000 | Strasser et al. |

OTHER PUBLICATIONS http://www.woodex-meco.com/mecohome.htm (1 p).
http://www.woodex-meco.com/meco3000.htm (1 p).
Adobe Acrobat file: "Woodex Bearing Company announces MECO It's Wicked Slick49 " (1 p).
Adobe Acrobat file: "MECO 3000. Typical Physical Properties." (1 p).
Adobe Acrobat file: "Typical Physical Properties for MECO 4000-series Bearing-Grade P.E.E.K. compounds." (1 p).
http://www.woodex-meco.com/woodhome.htm (2 pp).
http://www.woodex-meco.com/meco-std.htm (1 p).
http://www.woodex-meco.com/meco.com/mecocust.htm (1 p.).
http://www.woodex-meco.com/meco.com/history1.htm (3 pp).
http://www.woodex-meco.com/casindex.htm (1 p).
http://www.woodex-meco.com/case-101.htm (2 pp).
http://www.woodex-meco.com/choclate.htm (1 p).
http://www.woodex-meco.com/case-103.htm (1 p).
http://www.woodex-meco.com/case-104.htm (1 p).
http://www.woodex-meco.com/case-105.htm (2 pp).
http://www.woodex-meco.com/case-106.htm (2 pp).
http://www.woodex-meco.com/case-107.htm (2 pp).
http://www.woodex-meco.com/case-108.htm (9 pp).
http://www.woodex-meco.com/case-109.htm (2 pp).
http://www.woodex-meco.com/seaseal3.htm (2 pp).
http://www.woodex-meco.com/lupton.htm (2 pp).
http://www.woodex-meco.com/kennebec.htm (2 pp).
http://www.woodex-meco.com/seaseal4.htm (2 pp).
http://www.woodex-meco.com/images/mdr-iso2.jpg (1 p).
http://www.woodex-meco.com/sealboat.htm (1 p).
http://www.woodex-meco.com/images/sealboat.gif (1 p).
http://www.woodex-meco.com/distribs.htm (1 p).
http://www.woodex-meco.com/mdr.htm (2 pp).
http://www.woodex-meco.com/meco-pac.htm (2 pp).
http://www.woodex-meco.com/cac.htm (1 p).
http://www.woodex-meco.com/eas.htm (1 p).

* cited by examiner

SPLIT FACE MECHANICAL SEAL SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to methods and apparatuses for sealing machinery, more particularly to mechanical seal systems for rotary shafting mechanisms such as used in propulsors, pumps and compressors.

Current mechanical seal systems for the main propulsion shaft apparatus of marine vessels typically comprise either circumferential-type seals or face seals.

A known kind of circumferential seal includes packing which seals by being hydrostatically compressed from the axial clamping force of bolts acting on a stuffing box and packing gland arrangement. Other conventional methodologies of circumferential sealing include lip seals (or variations thereof) which make use of a spring to radially load an elastomer around the rotating shaft. Circumferential seals are inexpensive, but the failure mode involves leakage and shaft wear, with concomitant repairs entailing a new shaft sleeve or new shaft.

Face seals, on the other hand, have replaceable wearing elements which wear on their axial faces (i.e., perpendicular to the radial direction). These seals are easy to maintain once installed, since there is usually no or minimal leakage and there are no adjustments required. Generally, the failure mode for a face seal is leakage over time, which leads to replacement or seal face refurbishment.

A notable type of failure mechanism for propulsion shaft seals involves dirt and contamination which will wear at the sealing interface. An ideal seal behavior is one that exhibits recovery from leakage attributable to the ingestion of wear debris. The present invention has basis in the recognition that the design of the seal, including the design of the materials, plays an important role in promoting seal recovery.

Currently, the U.S. Navy almost exclusively uses face seals on its large surface ship combatants and submarines; its small combatants and commercial boats, however, most often implement circumferential seals. As compared with a circumferential seal, it is more desirable to use a face seal in smaller water craft (e.g., smaller naval combatants) because of the relative lack of attention required as well as the minimization of bilge leakage. In terms of commercial availability, there is an apparent dearth of completely split face seal designs such as would be suitable for the U.S. Navy's smaller marine vessels. Although small unsplit face seal designs are commercially available, these do not appear to be rugged enough for the naval marine environment. Moreover, the U.S. Navy lacks knowledge and experience with the design and materials used in the commercially available "off-the-shelf" products. The present invention appreciates that the design and materials for a small split face seal can be improved or optimized to suit U.S. Navy and other applications.

Incorporated herein by reference are the following pertinent United States patents: Reagan U.S. Pat. No. 5,820,129 issued Nov. 13, 1998; Clark et al. U.S. Pat. No. 5,725,220 issued Mar. 10, 1998; Duffee et al. U.S. Pat. No. 5,716,054 issued Feb. 10, 1998; Clark et al. U.S. Pat. No. 5,711,532 issued Jan. 27, 1998; Bessette et al. U.S. Pat. No. 5,662,340 issued Sep. 2, 1997; Reagan U.S. Pat. No. 5,615,893 issued Apr. 1, 1997; Azibert U.S. Pat. No. 5,571,268 issued Nov. 5, 1996; Borino et al. U.S. Pat. No. 5,529,315 issued Jun. 25, 1996; Radosav et al. U.S. Pat. No. 5,490,682 issued Feb. 13, 1996; Bowers U.S. Pat. No. 5,409,241 issued Apr. 25, 1995; Carmody U.S. Pat. No. 5,354,070 issued Oct. 11, 1994; Glynn et al. U.S. Pat. No. 5,292,138 issued Mar. 8, 1994; Pecht et al. U.S. Pat. No. 5,217,233 issued Jun. 8, 1993; Radosav et al. U.S. Pat. No. 5,199,720 issued Apr. 6, 1993; McOnie U.S. Pat. No. 5,192,085 issued Mar. 9, 1993; Radosav U.S. Pat. No. 5,114,163 issued May 19, 1992; Nagai et al. U.S. Pat. No. 5,067,733 issued Nov. 26, 1991; Mullaney U.S. Pat. No. 5,020,809 issued Jun. 4, 1991; Lowe et al. U.S. Pat. No. 4,795,169 issued Jan. 3, 1989; Azibert U.S. Pat. No. 4,576,384 issued Mar. 18, 1986; Copes U.S. Pat. No. 4,410,188 issued Oct. 18, 1983; Wilkinson U.S. Pat. No. 4,239,240 issued Dec. 16, 1980; Adams U.S. Pat. No. 3,773,337 issued Nov. 20, 1973.

SUMMARY OF THE INVENTION

In view of the foregoing, it is an object of the present invention to provide a reliable face sealing system for a rotary shafting mechanism, such as a ship's main propulsion shafting mechanism.

It is another object of the present invention to provide such a sealing system which will remain leak-free for a significant period of time, such as throughout the life cycle of a ship.

It is a further object of the present invention to provide such a sealing system which is easily maintainable.

Another object of the present invention is to provide such a sealing system which may be used in certain applications, such as in association with small naval vessels, wherein circumferential sealing systems are customarily used.

In accordance with the present invention, a mechanical face seal combination is suitable for use in connection with machinery of the type wherein an axially rotative shaft passes through an immobile housing. The inventive combination comprises a first annulus, a second annulus and support apparatus. The first annulus has a first annular face which is at least substantially planar. The second annulus has a second annular face which is at least substantially planar. The support apparatus includes biasing means. The first annulus, the second annulus and the support apparatus are adaptable to arrangement wherein: the first annulus is attached to the housing; the support apparatus is attached to the shaft; the first annular face and the second annular face coaxially abut; and, the support apparatus holds the second annulus in position with respect to the shaft whereby the biasing means contactingly presses the second annulus so as to approximately axially bias the second annular face against the first annular face.

Notable among the features of the present invention is the robust, integral construction of the rotational structure inclusive of the face (surface) designed for dynamic abutting contact with the face (surface) of the non-rotational structure. This rotational structure, viz., the second annulus, is able to directly bear, in the absence of any intermediary structure, the loading imposed by the support apparatus which holds the second annulus in place with respect to the rotational shaft. Similarly featured is the robust, integral construction of the non-rotational structure inclusive of the face (surface) designed for dynamic abutting contact with the face (surface) of the rotational structure. This rotational structure, viz., the first annulus, is able to be directly coupled with the housing—e.g., directly fastened to the flanged (radially annularly projecting) end portion of a ship's stern tube.

A resultant advantage of the superior material strength and unitary construction of both the first annulus and the second annulus is the reduction of parts needed for the overall seal configuration, with the concomitant advantage of a simplified design. In particular, obviated is the functional or structural need for additional or auxiliary structure—whether it be of an intermediary, intervening, interpositional, dampening, buffering, holding and/or containing nature—used in association with: (i) the first (stationary) annulus in relation to the stationary housing; and, (ii) the second (rotational) annulus in relation to the support apparatus which holds the second annulus in place with respect to the rotational shaft.

According to many inventive embodiments, the second (rotational) annulus includes (e.g., is at least substantially made of) a polymeric matrix composite characterized by sufficient structural integrity (e.g., in terms of strength, rigidity and elastic deformation) for enduring the holding by the support apparatus (under both rotating and non-rotating conditions of the shaft), including enduring the pressing by the biasing means. According to typical inventive practice, the second annulus is provided with openings (e.g., slots) and the support apparatus is provided with projections (e.g., cogs); the holding operation of the second annulus by the support apparatus includes the interlocking or mating of the openings and projections; at the same time, spring devices (or other spring-loading means) pushing off the support apparatus are exerting an axial force against the second annulus. The robust material composition of the second apparatus enables it to resist the stresses and strains associated with such modes of containment by the support apparatus.

Another feature of note according to many inventive embodiments is a complementarity of the respective material compositions of the rotational structure and the non-rotational structure, thus giving rise to the complementarity of their respective wear surfaces. According to many inventive embodiments, the first (stationary) annulus includes (e.g., at least substantially consists of) a metal matrix composite (MMC) or a ceramic matrix composite (CMC), and the second (rotational) annulus includes (e.g., at least substantially consists of) a polymer matrix composite (PMC). It is believed that the present invention's matrix-composite-on-matrix-composite material wear combination will imbue the wear interface, on a continual basis, with "self-healing" ("leakage-restorative") and contamination-resistant attributes.

The present invention thus features a single stationary wearing piece and a single rotational wearing piece. These inventive features are predicated on the inventive observation that a wearing face structure made of an appropriate matrix composite material will be accorded both structural and tribological properties. According to preferred practice of this invention, both the stationary wearing piece and the rotational wearing piece will be made of a matrix composite material; that is, the stationary wearing piece will be made of MMC or CMC, and the rotational wearing piece will made of PMC.

Therefore, according to this invention, both the stationary wearing piece and the rotational wearing piece will be endowed with "structural" attributes, especially in terms of load-bearing capabilities. Furthermore, the PMC material of the rotational wearing piece, in interacting with the MMC or CMC material of the stationary wearing piece, will provide "lubricity" to the wear interface. In other words, the rotational wearing piece's PMC material will afford a transfer of polymeric material so as to develop a "transfer film" of low shear strength, thus allowing for a low coefficient of friction against a stationary wearing piece made of a wear-resistant matrix composite material such as MMC (e.g., a bronze ceramic matrix, which is essentially a ceramic-filled bronze) or a CMC.

According to conventional seal technology, the seal faces must maintain their original flat surfaces in order for them to to actually seal. If either or both wear surfaces become "out of flat" or worn, then the sealing capabilities will degrade. The traditional approach is to utilize hard and brittle materials such as silicon carbide or carbon, which will tend to maintain their original flat surface condition for some period of time; however, once there is a wear spot, the seal must be removed and replaced. The conventional requirement of a high degree of flatness in a hard brittle material can be costly and time-consuming.

By contrast, according to this invention, the utilization of a combination of two kinds of matrix composite materials within a certain sealing geometry will promote leakage restoration, and therefore will not require brittle materials and precise surface conditions. According to the present invention, the flatness tolerance is relaxed due to the implementation of the selected engineered matrix composite materials. The combination of matrix composite materials can be "lapped" in place via the natural machining action of the seal and the concomitant rubbing of the wearing surfaces. The material design is hence also contamination-resistant, since the contaminants will be subsumed in the ongoing self-healing process of the wear interface.

The present invention thus provides a lower cost seal system requiring significantly less "down" time for repair or maintenance, which conventionally involves disassembly. Another benefit of using metal matrix composite and polymeric matrix composite materials is that they are both corrosion-resistant. An additional benefit of the inventive seal system, arising from its "self-healing quality," is the minimization of installation space around the seal, which would traditionally be needed for maintenance and repair; the present invention thus allows for the insertion of additional machinery in spaces that would conventionally be reserved to make room for personnel.

The inventive use of wear-resistant and self-lubricating matrix composite materials will thus provide long wearing surfaces. The characteristics of the matrix composite materials can be optimized or tailored according to the particular inventive application. The selected matrix composite materials can be specially developed, custom engineered or purchased commercially (e.g., "off the shelf"). The matrix composite materials can be selected, according to this invention, on the basis of a general model wherein a stationary face piece made of a metal matrix material or ceramic matrix material is in rubbing contact with a rotative face piece made of a polymeric matrix material, and wherein the metal or ceramic matrix material affords wear resistance while the polymeric matrix material affords lubricity via transfer film formation. Generally, each of these kinds of matrix composite materials (viz., MMC, CMC and PMC) are castable and/or moldable materials which allow for near net shape and/or final shape, thus requiring a minimal amount of processing.

Another feature of many inventive embodiments is a completely split seal design. In other words, the entire inventive split seal assembly can be applied in place to the machinery, without any need for disassembly of the shaft line. According to many inventive embodiments, there are four main generally annular structures, viz.: (i) the stationary face structure (e.g., stationary seal face); (ii) the rotative face structure (e.g., floating seal ring); (iii) the coupling structure (e.g., drive ring), which serves to hold the rotative face structure in position with respect to the shaft); and, (iv) the clamp structure (clamp ring), which serves to clamp the coupling structure with respect to the shaft. The terms "annular" and "ring-shaped," as used herein, refer to a shape which generally, substantially, essentially or approximately describes that of a circular ring. All four ring-shaped structure basically describe an overall annular shape when -viewed elevationally in the axial direction; further, each ring-shaped structure has its own cross-sectional geometry. All of these ring-shaped structures lend themselves to having a "split" construction wherein two semi-annular halves can be united (into one annular piece) and disunited (into two semi-annular pieces).

According to this invention, there is no need for any complex locking mechanism (e.g., such as would have to account for seawater), or for any difficult machining process such as would be applied to the shaft sleeve or shaft. In this regard, the present invention provides for uncomplicated engagement of the stationary face ring with the housing, of the rotational face ring with its support ring, and of the face ring's support ring with its clamp ring—all requiring no real structural modification (other than the machining of holes). This is especially beneficial for applications wherein the shaft, shaft sleeve and or other parts are made of composite materials.

Inventive practice can also admit of configurational adjustment of the inventive seal system under damaged conditions. Parts of an inventive face seal system can be removed and rearranged, with packing introduced, thereby basically "salvaging" the original component; for continous use, through minimal effort.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Figure 1:
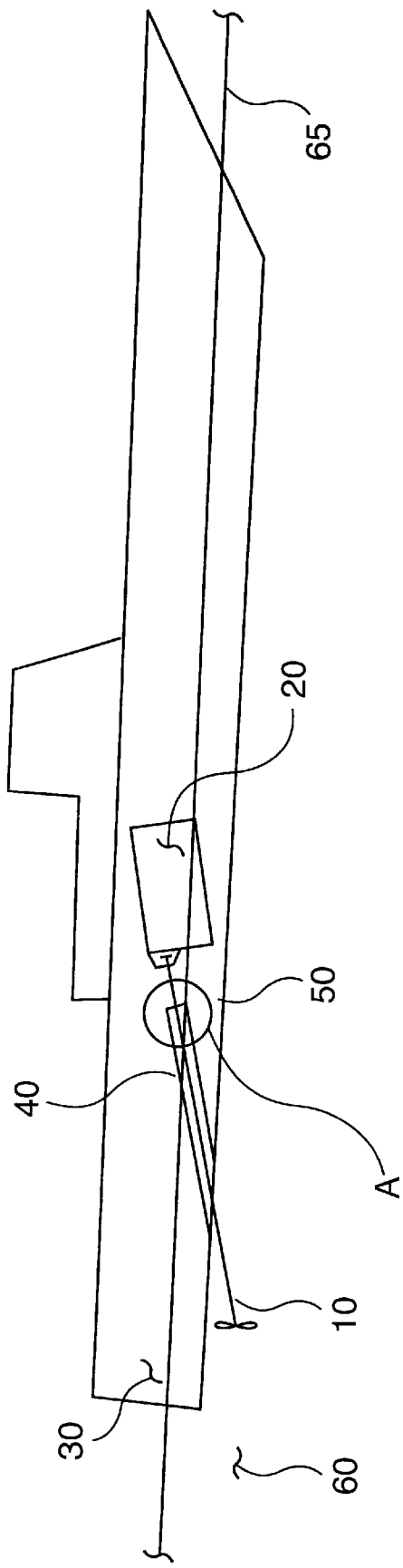
FIG. 1 is a diagrammatic cutaway side elevation view of a ship hull form illustrating, in association with a propulsion unit, an embodiment of a seal assembly in accordance with the present invention.

Referring now to FIG. 1, propulsion shaft 10 transmits power developed from propulsion plant 20, located within ship 30. Ship 30 operates in the seawater 60 environment. The seawater 60 surface rises approximately to waterline 65 on the hull of ship 30. A shaft sleeve, stem tube 40, contains the rotating main propulsion shaft 10. Located at the inboard end is a seal assembly 50 which prevents the ingress of seawater 60.

Figure 2:
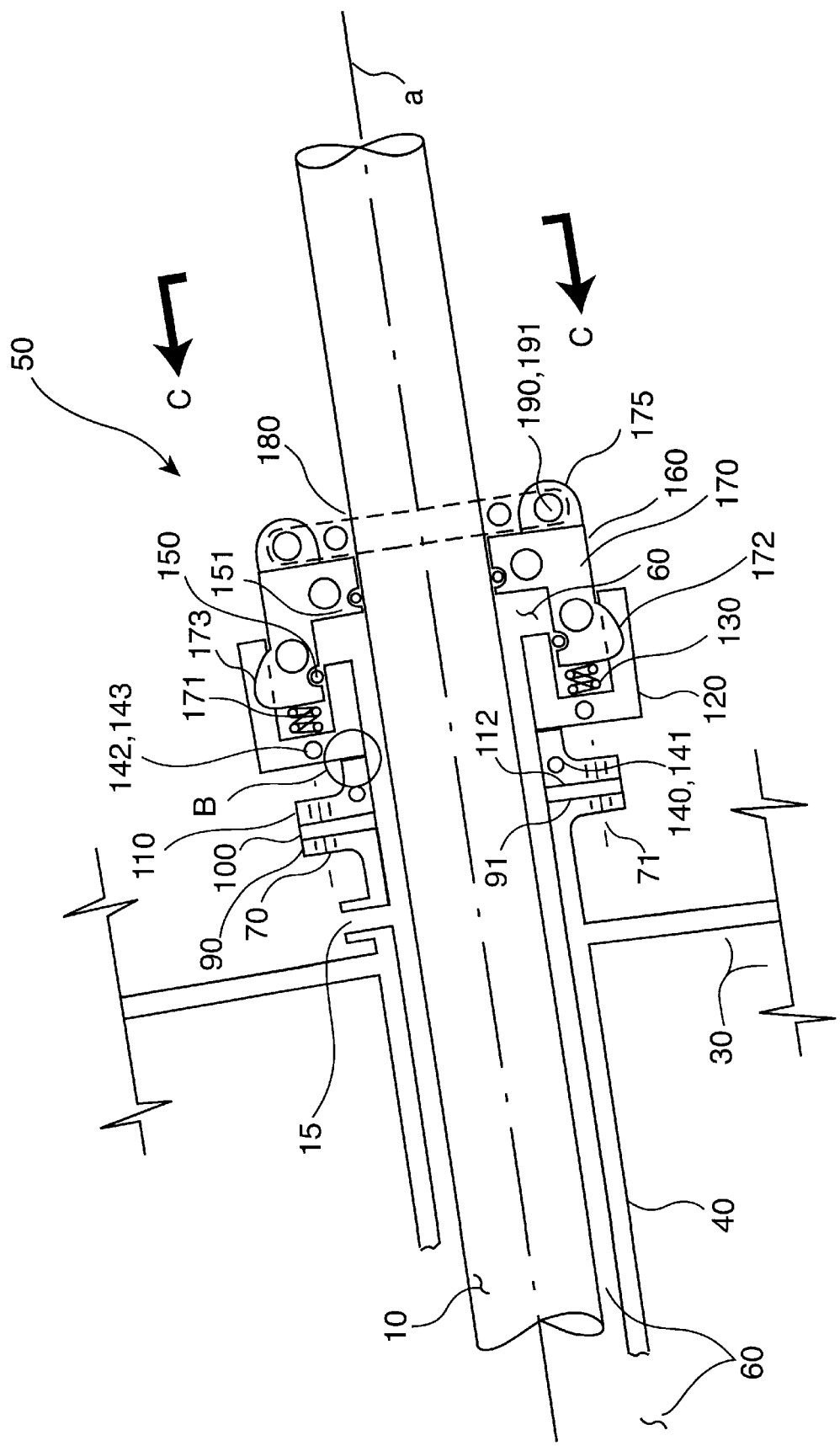
FIG. 2 is a detail view, as indicated by encirclement A in FIG. 1, of the seal assembly and propulsion unit shown in FIG. 1
Figure 3:
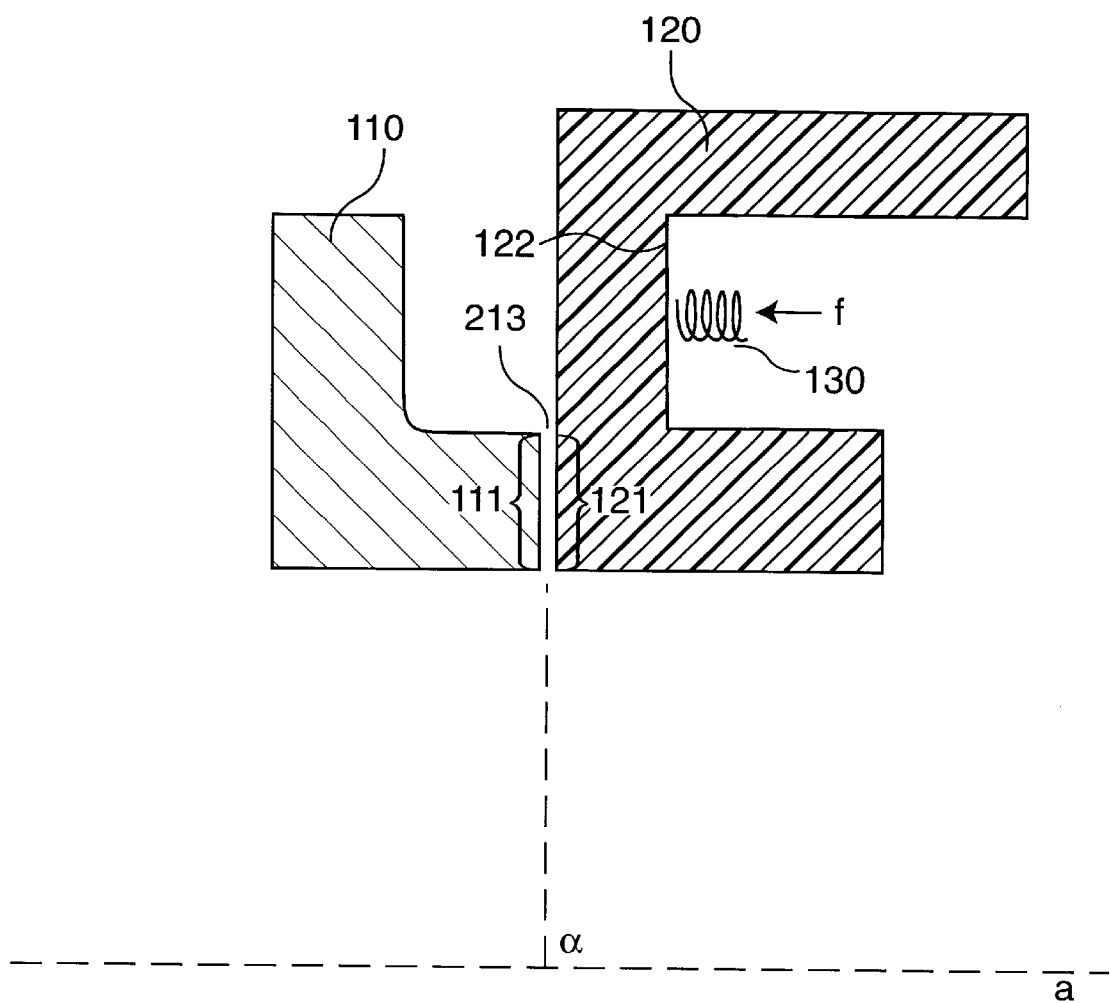
FIG. 3 is a detail view, as indicated by encirclement B in FIG. 2, of the abutment of the seal face and seal ring shown in FIG. 2.
Figure 4:
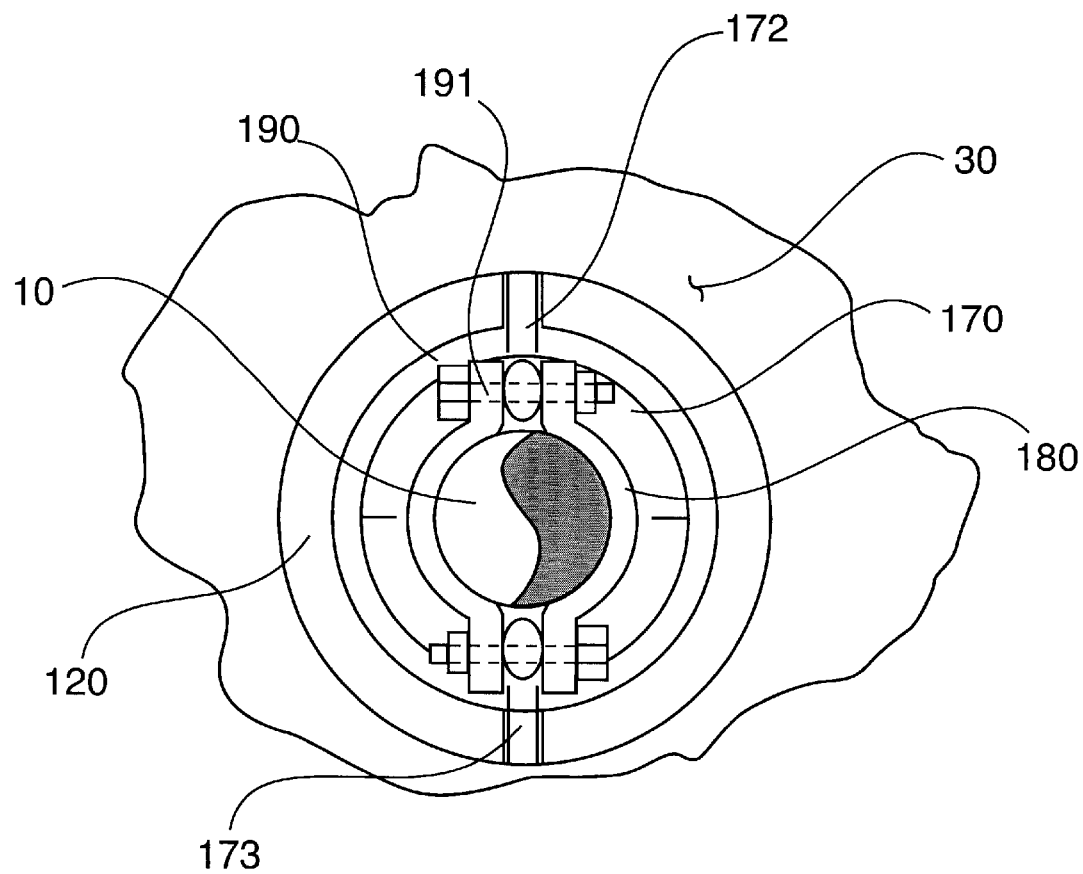
FIG. 4 is a diagrammatic end elevation view looking aft, as indicated by C—C in FIG. 2, of the seal assembly and propulsion unit shown in FIG. 2.

With reference to FIG. 2, FIG. 3 and FIG. 4, shaft 10 has rotational axis a. Seal assembly 50 is bolted via machined through-holes 70, using fasteners 71, to a mating (mounting) flange 90, located at the stem tube 40 inboard end. More specifically, stationary seal face 110 is bolted to flange 90. Flange 90 has an annular flange surface 91 which fixedly abuts (with gasket 100 interposed) the annular outboard end surface 112 of stationary seal face 110. A flexible gasket 100 provides a static seal between the seal assembly 50 and the mating flange 90. Inlet 15 in stem tube 40 provides a cooling water connection. Accordingly, adjacently attached to mating flange 90 is seal assembly 50, which comprises the following main components, described hereinbelow and generally considered in order from left to right as represented in FIG. 2: stationary seal face 110; rotatable seal ring 120; o-ring seals 150 and 151; drive ring 170; clamp 180.

A split stationary seal element referred to herein as a "seal face," seal face 110, is made of a metal matrix composite (MMC) material or a ceramic matrix composite (CMC) material. As shown in FIG. 2 and FIG. 3 (and also FIG. 5), seal face 110 has a radial cross-section which describes an "L-shape." seal face 110 includes two halves which are assembled around shaft 10. The two half-portions of seal face 110 are joined using fasteners 141 which are inserted through machined through-holes 140. Seal face 110 is then fastened, using fasteners 71, to mating flange 90.

A split rotatable seal element referred to herein as a "seal ring," seal ring 120, is made of a polymer matrix composite (PMC) material. As shown in FIG. 2 and FIG. 3 (and also FIG. 5), seal ring 120 has a radial cross-section which describes a "sideways U-shape" (or, equivalently, a "C-shape"). Similar to seal face 110, seal ring 120 is a split assembly comprising two halves which are held together by fasteners 143 inserted through machined through-holes 142.

Figure 5:
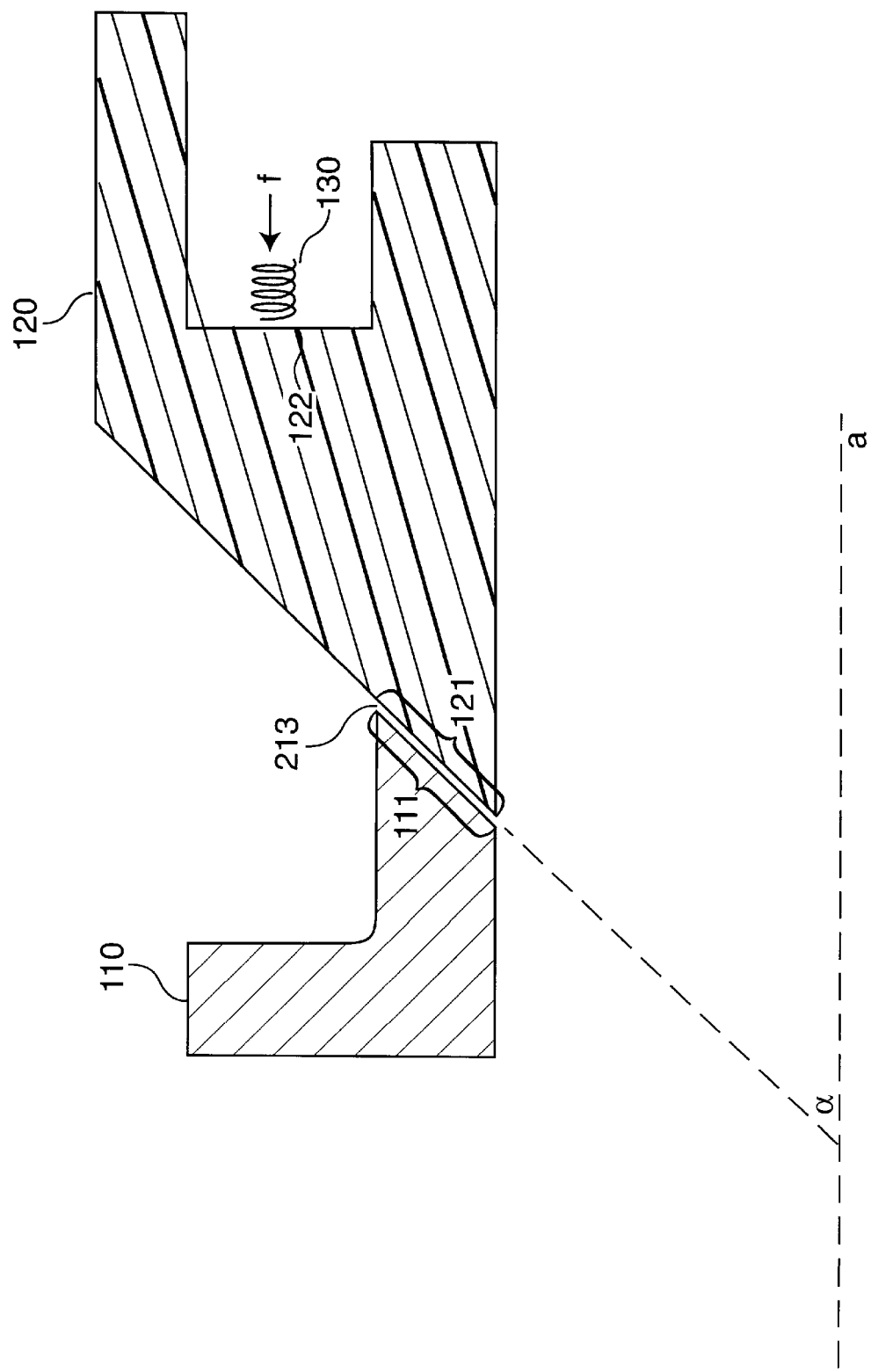
FIG. 5, FIG. 5a, FIG. 5b and FIG. 5c are views, similar to that shown in FIG. 3, of embodiments wherein a seal face and seal ring obliquely abut.
Figure 5A:
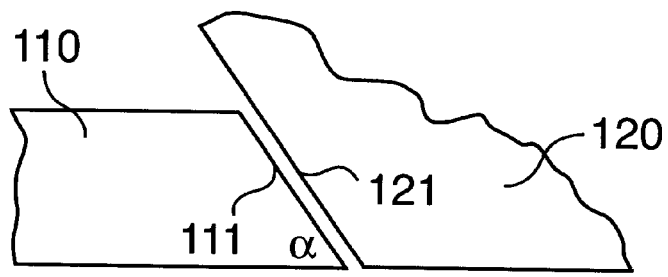
Figure 5B:
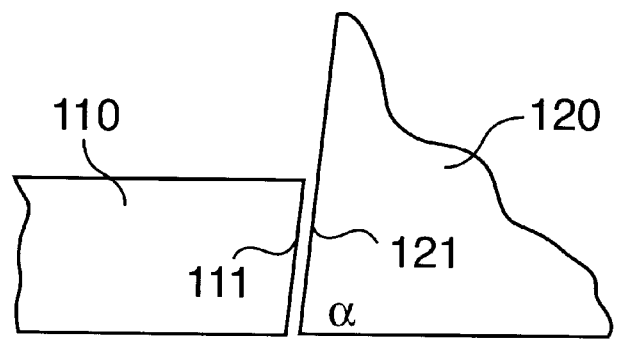

As particularly well shown in FIG. 3 and FIG. 5, the two wear elements, viz., stationary seal face 110 and rotatable seal ring 120, have corresponding annular planar surface portions (viz., wear surface 111 and wear surface 121, respectively) which abut each other. Wear surface 111 (which seal face 110 includes) and wear surface 121 (which seal ring 120 includes) are the adjoining annular wear surfaces ("mating faces") in relation to each other.

"Floating" seal ring 120 is. loaded against seal face 110 via the force f from plural springs 130 and from seawater 60 pressure acting against the seal ring 120 area. Seal ring 120, having a radially cross-sectional sideways U- shape, is propitiously configured to both hold and protect springs 130. Preferably, springs 130 are approximately equally distributed around the circumference defined by the interface between the annular alcove surface 122 of seal ring 120 and the annular outboard end surface 171 of drive ring 170.

Still referring to FIG. 2 through FIG. 4, seal ring 120 requires a secondary seals, e.g., static O-ring seal 150.

O-ring seal 150 circumferentially seals between seal ring 120 and drive ring 170. Shaft 10 also requires a secondary seal, e.g., static O-ring seal 151. O-ring seal 151 circumferentially seals between shaft 10 and drive ring 170.

Drive ring assembly 160 includes drive ring 170, split shaft clamp 180 and fasteners 190. Drive ring assembly 160 (in particular, drive ring 170) is fastened around shaft 10 in a split fashion. Drive ring 170 is characterized by a radial cross-section which describes an "inverted L-shape." Like seal face 110 and seal ring 120, drive ring 170 is characterized by divisibility ("splittability") into two halves or semi-sections; installation is accomplished by appropriately disposing the semi-sections in relation to shaft 10 and then uniting the semi-sections to form a ring-shaped unit which encircles shaft 10. Many embodiments thus advantageously afford "splittability" (and hence ease of installation and repair) of the three principle annular components of the present invention's mechanical split seal assembly, viz., seal face 110, seal ring 120 and drive ring 170.

Ears 175, protruding axially from drive ring 170, attach to the split shaft clamp ring 180 which is held in place with fasteners 190 through aligned holes 191. Again, clamp ring 180 is characterized by divisibility into two half-annular portions, similarly as are seal face 110, seal ring 120 and drive ring 170. Installation of clamp ring 180 is similarly accomplished by appropriately placing the half-annular portions with respect to shaft 10 and then joining the semi-sections to form a ring-shaped clamp ring 180 unit which encircles shaft 10. Each half-annular portion of clamp ring 180 has, at opposite ends, two apertured axial protrusions 181; thus, when the half-annular portions are joined to become clam ring 180, at diametrically opposed locations each ear 175 is sandwiched and fastened (e.g., bolted) to and between two protrusions 181.

Drive ring assembly 160 contains the static seals 150 and 151 along seal ring 120 and shaft 10, respectively, and transmits the rotational torques from friction between seal face 110 and seal ring 120. At least two axial projections 172 (which resemble tangs, cogs, etc.), emanating from the outside diameter of drive ring 170, engage (e.g., mesh or mate with) corresponding slots 173 of seal ring 120.

Figure 5C:
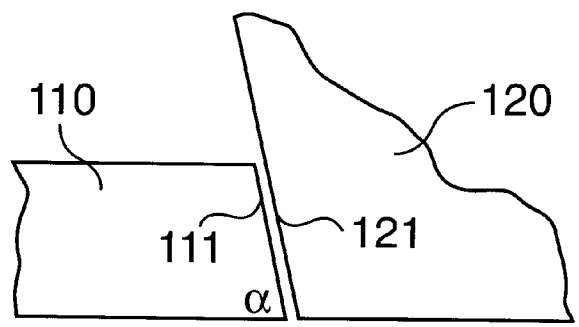

As shown in FIG. 2 and FIG. 3, seal face 110 wear surface 111 and seal ring 120 wear surface 121 are coaxially and contiguously situated so as to describe a planar interface or junction 213 which is disposed at a ninety degree angle α in relation to the axis a of shaft 10. However, according to the present invention, junction 213 need not be perpendicular to shaft 10 axis a. Referring to FIG. 5 through FIG. 5c, junction 213 variously is non-perpendicularly inclined at an angle α with respect to axis a. As shown in these figures, the plane defined by junction 213 is inclined at an oblique angle α of at least about forty-five degrees.

In accordance with the present invention, seal face 110 is preferably made of wear resistant material such as a ceramic matrix composite (CMC) material or a metal matrix composite (MMC) material. Further, in accordance with the present invention, seal ring 120 is preferably made of a self-lubricating polymer matrix composite (PMC) material. An MMC seal face 110 composition may be preferable to a CMC seal face 110 composition for many inventive embodiments, because MMC material has some superior properties vis-a-vis' CMC material. For instance, ceramic matrix composites have been known to be beset with problems such as matrix brittleness; see, e.g., below mentioned book John W. Weeton, Dean M. Peters and Karyn L. Thomas, *Engineers' Guide to Composite Materials*, American Society for Metals, Metals Park, Ohio, 1987, pp 1–2 to 1–4. An example of a preferred MMC material for many inventive embodiments is bronze ceramic matrix composite (i.e., ceramic-filled bronze matrix material).

According to some inventive embodiments, stationary seal face 110 is at least substantially composed of a kind of matrix composite material other than an MMC or a CMC. As an alternative to MMC or CMC, the following matrix composites may also be suitable for inventive practice of the stationary wear structure (such as seal face 110), for instance in terms of affording requisite wear-reisistance: glass matrix composites; carbon matrix composites; and, graphite matrix composites.

Hence, according to this invention, the materials used in the wearing elements (viz., seal face 110 and seal ring 120) ideally are non-corroding and are integral with the structure so as to minimize components. Thus, in inventive practice, the wearing elements will be at least substantially composed of near net shape materials (e.g., fiber-reinforced matrix materials) which are castable, machineable and/or moldable. The respective matrix composite compositions of the two wearing elements are features which give rise to significant advantages in comparison to conventional approaches to mechanical sealing.

Among the several advantages of the present invention's double matrix composite (MMC-contacting-PMC or CMC-contacting-PMC) wear combination, such wear combination will generally promote leakage restoration, thereby affording a "self-healing" quality which will obviate the need for great geometrical or configurational precision of the wearing elements and their interrelationship. Leakage will be tolerated to the point of diminshment as the seal wears in. The self-healing attribute will permit less precision since leakage will be tolerated to the point of diminshment as the seal wears in. Since this wear combination will advance leakage restoration, it will reduce the need for disassembly due to wear or leakage.

Moreover, such double matrix composite wear combination will generally allow for a reduced number of parts or a simplified design, such as exemplified by the inventive embodiment shown in FIG. 1 through FIG. 4. In particular, the wearing elements will have structural integrity because the matrix composite materials will be structural materials. Furthermore, these matrix composite wearing elements will lend themselves to easy manufacturing techniques. A PMC part might be cast, extruded or machined with an alignment (locational) fit and therefore might not require, in the context of the mechanical seal system, a centering or holder device; what might be required is a band clamp to hold the pieces together.

A composite is a combination of two or more materials which differ at the macroscopic level, each different material being a constituent of the composite. A matrix composite comprises (i) a filler or reinforcing agent (e.g., fibers, particles or fillers) and (ii) a matrix binder (e.g., a resin). The matrix is the principal phase or aggregate in which the filler or reinforcing agent is embedded or surrounded. Generally, the matrix serves two functions, viz., (i) it holds the reinforcement phase in place, and (ii) under an applied force, it deforms and distributes the stress to the reinforcement constituents.

Examples of metals (metal elements, or alloys of two or more metal elements) conventionally used as matrices in metal matrix composites are aluminum, titanium; bronze and magnesium. A broad range of fillers or reinforcing agents (e.g, fibers) can be used with lower-melting point matrices. For instance, most metals, ceramics and compounds can be used as fillers or reinforcing agents in an aluminum or magnesium matrix. The choice of fillers or reinforcing agents becomes increasingly limited as the melting point of the metal matrix material increases.

Ceramic compounds are formed by the combination of one or more metallic elements with one or more nonmetallic elements. Examples of ceramic materials include aluminum oxide, magnesium oxide and silica.

There are two main types of polymers, viz., thermoplastics and thermosets. Examples of thermoplastics which can be used as matrix resins include polycarbonate, polyethylene, polystyrene, polypropylene, polyamide, fluoropolymer, thermoplastic polyester, nylon, vinyl, acetal, polycarbonate, polyphenylene oxide, polyetheretherketone (PEEK), polyphenylene sulfide (PPS), polyetherketone ketone (PEKK) and polyetherketone (PEK). Examples of thermosets which can be used as matrix resins include epoxy, polyester, vinyl ester, phenolic, polyimide and bismaleide.

Conventional types of fillers and reinforcing agents (e.g., reinforcing fibers) used in the fabrication of matrix composites include glass, cotton, aramid, carbon, graphite, polyethylene, boron, steel, polyamide, alumina, silicon carbide and aluminaboria-silica.

The following references, incorporated herein by reference, are instructive generally regarding matrix composites and particularly regarding metal matrix composites, polymer matrix composites and ceramic matrix composites: John W. Weeton, Dean M. Peters and Karyn L. Thomas, *Engineers' Guide to Composite Materials*, American Society for Metals, Metals Park, Ohio, 1987 (See, esp., Section 1, entitled "Introduction to Composite Materials"); George Lubin, *Handbook of Composites*, Van Nostrand Reinhold Company, New York, 1982 (See, esp., Chapter 1, entitled "An Overview of Composites"); Roy L. Harrington, Editor, *Marine Engineering*, the Society of Naval Architects and Marine Engineers, Jersey City, N.J., 1992 (See, esp., Chapter XXII, entitled "Construction Materials," Section 5, entitled "Composite Materials").

The following United States patents, incorporated herein by reference, are exemplary of various composite matrix materials which may be suitable for inventive practice of the wearing elements: Cohen et al. U.S. Pat. No. 6,000,851 issued Dec. 14, 1999; Cohen U.S. Pat. No. 5,389,411 issued Feb. 14, 1995; Divecha et al U.S. Pat. No. 5,337,803 issued Aug. 10, 1994 Karmarkar et al. U.S. Pat. No. 5,025,849 issued Jun. 25, 1991. Cohen et al. '851 disclose (column 2) "a spin castable multiphase bearing material, such as a metal matrix composite, ceramic matrix composite and/or a polymer matrix composite to minimize wear over the life cycle of the motor or apparatus with which the bearing assembly is associated." Karmarkar et al. disclose a process involving spin (centrifugal) casting into symmetrical shapes of fiber-reinforced metal matrix material.

The present invention can alternatively be embodied in a reconfigurable "packing gland" arrangement—a circumferentially sealing configuration which may be appropriate as an inventive modification in response to a damage condition such as worn seal faces or failed spring operation. Under circumstances wherein an inventive face sealing system such as seal assembly 50 shown in FIG. 1 through FIG. 4 is in need of repair, it can be inventively converted to what would essentially represent an inventive circumferential sealing system such as seal assembly 50a shown in FIG. 6. The inventive arrangement shown in FIG. 6 can also be practiced "from scratch" rather than adaptively.

Figure 6:
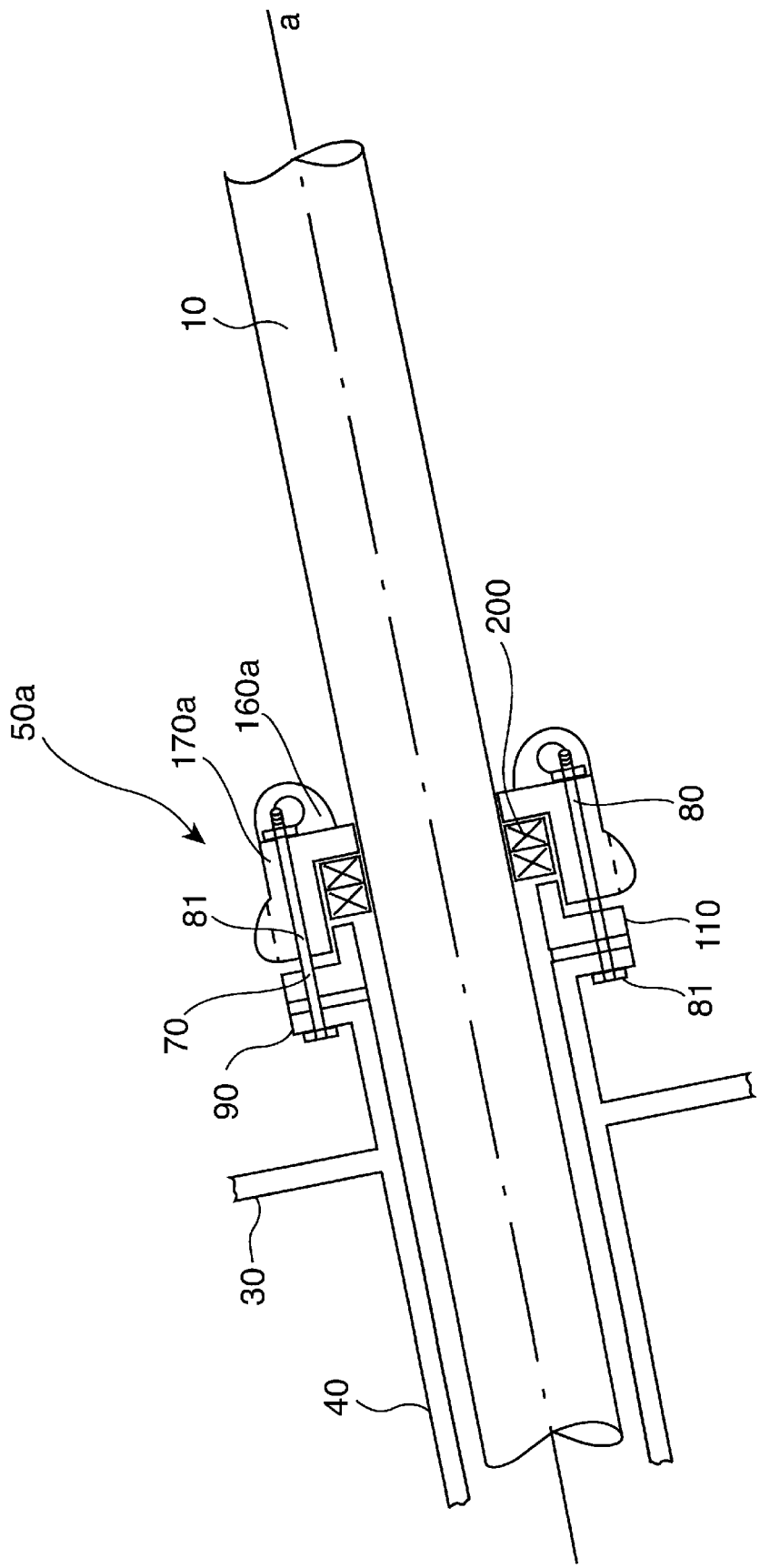
FIG. 6 is a diagrammatic elevation view, similar to the view shown in FIG. 2, of another embodiment of a seal assembly in accordance with the present invention.

With reference to FIG. 6, seal assembly 50a operates on packing gland 200. A notable feature of seal assembly 50a is that the following parts/components are absent or removed, viz., seal ring 120, both secondary seals (o-rings) 150 and 151, and clamp ring 180. Thus, the drive ring assembly 160a shown in FIG. 6 represents a sort of "stuffing box" drive ring assembly, wherein loading pressure is applied via the packing gland bolts 81 which are inserted through through-holes 70 (which are machined in flange 90 and seal face 110) and through-holes 80 (which are machined in drive ring 170a).

Many small marine craft have shaft tubes 40 without a mounting (mating) flange 90. A flexible hose with clamps is often used to hold a floating packing gland such as packing gland 200. In order to provide a mounting surface, a flange must be provided, or the seal face 110 must be connected to the stern tube 40 using the existing hose and clamps.

There are other possible inventive configurational combinations of the various components which will allow for placement of the seal assembly with respect to the propulsion shaft. For instance, with regard to the packing gland arrangement shown in FIG. 6, at a propitious time the location of the stuffing box relative to the packing gland can be reversed, thus possibly permitting the reutilization or extended utilization of existing components.

There are also alternative fastening methodologies according to this invention. For instance, clamp bands can be used in place of fasteners. As another example, a hydraulic shaft locking device can be used in place of the shaft clamp band; this may eliminate tampering and provide a safe alternative to bolting.

Alternative applications of the present invention include marine propulsors, pumps and compressors. In fact, the present invention admits of application as a shaft seal device in any similar mechanical context which requires a split design, long wearing materials and non-wearing secondary sealing elements on the shaft.

Typical inventive embodiments feature plural ring-shaped objects which are each characterized by a two-piece construction, wherein two semicircular halves are attachable and detachable with respect to each other. Each ring-shaped object thereby affords the capability of being assembled onto and around a cylindrical object (such as a shaft) and disassembled therefrom, and of accomplishing same without significantly disturbing the cylindrical object. As exemplified in FIG. 2 and FIG. 4, inventive seal assembly 50 includes four dichotomous ("split") ringshaped objects (stationary seal face 110, rotatable seal ring 120, drive ring 170 and clamp ring 180) which, when appropriately installed, are closely and sequentially disposed in coaxial alignment along shaft 10. Inventive seal assembly 50 thus admits of ease and totality of installation, absent disruption or displacement of shaft 10 or other parts of the shafting mechanism.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A mechanical face seal combination suitable for use in connection with machinery of the type wherein an axially rotative shaft passes through an immobile housing, said combination comprising a first annulus, a second annulus and support apparatus; said first annulus having a first annular face which is at least substantially planar; said second annulus having a second annular face which is at least substantially planar; said first annulus essentially constituting a unitary component of said combination, essentially consisting of a non-polymeric matrix-reinforcement composite material, and essentially having been formed as an integral whole so as to be characterized by structural integrity wherein said reinforcement contributes to said structural integrity of said first annulus; said second annulus essentially constituting a unitary component, essentially consisting of a polymeric matrix-reinforcement composite material, and essentially having been formed as an integral whole so as to be characterized by structural integrity wherein said reinforcement contributes to said structural integrity of said second annulus; said support apparatus including biasing means; said first annulus, said second annulus and said support apparatus being adaptable to arrangement wherein said first annulus is attached to said housing, said support apparatus is attached to said shaft, said first annular face and said second annular face coaxially abut so as to essentially describe the slidable rotatable engagement of said non-polymeric matrix-reinforcement composite material and said polymeric matrix-reinforcement composite material, and said support apparatus holds said second annulus in position with respect to said shaft whereby said biasing means contactingly presses said second annulus so as to approximately axially bias said second annular face against said first annular face; said first annulus being characterized by sufficient said structural integrity for withstanding said attachment to said housing; said second annulus being characterized by sufficient said structural integrity for withstanding said holding by said support apparatus, said withstanding of said holding including withstanding of said contacting pressing by said biasing means.

2. The combination according to claim 1, wherein said second annulus has plural apertures, said support apparatus has plural protuberances, said holding by said support apparatus includes insertion of said protuberances in said aperatures, and said withstanding of said holding includes withstanding said insertion of said protuberances.

3. The combination according to claim 2, wherein said first annulus essentially consists of a non-polymeric matrix-reinforcement composite material which is a metal matrix-reinforcement composite material.

4. The combination according to claim 2, wherein said first annulus essentially consists of a non-polymeric matrix-reinforcement composite material which is a ceramic matrix-reinforcement composite material.

5. The combination according to claim 1, wherein said first annulus essentially consists of a non-polymeric matrix-reinforcement composite material selected from the group consisting of metal matrix-reinforcement composite material and ceramic matrix-reinforcement composite material.

6. The combination according to claim 1, wherein:
   said biasing means includes at least two spring devices; and
   each said spring device contactingly presses said second annulus.

7. The combination according to claim 1, wherein:
   said first annulus includes two separable approximately semi-circular sections;
   said combination further comprises at least two fasteners for joining said semi-circular sections;
   said second annulus includes two separable approximately semi-circular sections; and said combination further comprises at least two fasteners for joining said semi-circular sections.

8. The combination according to claim 1, said support apparatus being adaptable to arrangement wherein the imaginary plane defined by the abutment of said first annular face and said second annular face is approximately perpendicular to said axis.

9. The combination according to claim 1, said support apparatus being adaptable to arrangement wherein the imaginary plane defined by the abutment of said first annular face and said second annular face is oblique with respect to said axis.

10. The combination according to claim 1, wherein:
   said first annulus has a first opposite annular face which is at least substantially planar and which defines an imaginary plane which is approximately perpendicular to said axis, said first opposite annular face being generally opposite said first annular face;
   said second annulus has a second opposite annular face which is at least substantially planar and which defines an imaginary plane which is approximately perpendicular to said axis, said second opposite annular face being generally opposite said first annular face;
   said housing includes a flange having a flange surface which is at least substantially planar and which defines an imaginary plane which is approximately perpendicular to said axis;
   said contacting pressing by said biasing means is against said second opposite annular face; and
   said attachment to said housing essentially consists of attachment to said flange so that said first opposite annular face and said flange surface are adjacent, said withstanding of said attachment to said housing including the withstanding of said attachment to said flange.

11. The combination according to claim 1, wherein the slidable rotatable engagement of said non-polymeric matrix-reinforcement composite material and said polymeric matrix-reinforcement composite material is characterized by self-reparative wear of said polymeric matrix-reinforcement composite material.

12. A mechanical seal assembly for utilization in association with a stationary housing and a rotatable shaft for being disposed therethrough, said housing including a flange portion including an approximately flat flange surface, said rotatable shaft having an imaginary axis, said mechanical seal assembly comprising:
   a stationary structure including, on opposite sides of said stationary structure and facing in approximately opposite directions, an approximately flat annular stationary wear surface and an approximately flat, said stationary structure being at least substantially composed of a reinforced non-polymeric matrix composite material, said stationary structure having an integral construction and including plural reinforcement constituents which lend structural strength to said stationary structure, said stationary structure thereby being capable of functioning as a stand-alone element of said mechanical seal assembly;
   a rotatable structure including, on opposite sides of said rotatable structure and facing in approximately opposite directions, an approximately flat annular rotatable wear surface and an approximately flat annular rotatable non-wear surface, said rotatable structure being at least substantially composed of a reinforced polymeric matrix composite material, said rotatable structure having an integral construction and including a plurality of reinforcement constituents which lend structural strength to said rotatable structure, said rotatable structure thereby being capable of functioning as a stand-alone element of said mechanical seal assembly;

spring-loading means; and a rotatable coupler unit;

wherein, according to said utilization:

said flange surface, said annular stationary wear surface, said annular stationary non-wear surface, said annular rotatable wear surface and said annular rotatable non-wear surface are approximately coaxial with said axis, approximately parallel to each other and approximately perpendicular to said axis;

said annular stationary wear surface and said annular rotatable wear surface are in slidable communication wherein said slidable communication is at least substantially limited to slidable communication between said reinforced non-polymeric matrix composite material and said reinforced polymeric matrix composite material;

said stationary structure and said flange portion are fastened to each other so that said annular stationary non-wear surface and said flange surface are fixedly and adjacently joined, said stationary structure thereby being secured with respect to said housing;

said rotatable coupler unit is secured with respect to said rotatable shaft;

said rotatable coupler unit couples said rotatable structure with said rotatable shaft;

said spring-loading means connects said rotatable structure and said rotatable coupler unit so that said spring-loaded means contacts said annular rotatable non-wear surface and applies an approximately axial force directly against said rotatable structure and toward said stationary structure;

said capability of said stationary structure of functioning as a stand-alone element includes the capability of said stationary structure of permitting said fastening of said stationary structure and said flange portion in the absence of any other means of effecting said securement of said stationary structure with respect to said housing; and said capability of said rotatable structure of functioning as a stand-alone element includes the capability of said rotatable structure of permitting said application of an approximately axial force directly against said rotatable structure in the absence of any object intermediate said annular rotatable non-wear surface and said spring-loading means.

13. A mechanical seal assembly as recited in claim 12, wherein:

said stationary structure describes an approximate ring shape and an approximate L-shaped radial cross-section;

said stationary structure includes an inner circumferential stationary structure portion and a radial stationary structure portion;

according to said utilization, said inner circumferential stationary structure portion is approximately parallel to said axis, said radial stationary structure portion being approximately perpendicular to said axis;

said radial stationary structure portion includes said annular stationary non-wear surface; and said circumferential stationary structure portion includes said annular stationary wear surface.

14. A mechanical seal assembly as recited in claim 12, wherein:

said stationary structure describes an approximate ring shape and an approximate L-shaped radial cross-section; and according to said utilization, said annular stationary wear surface and said annular stationary non-wear surface are located at axially opposite ends of said stationary structure.

15. A mechanical seal assembly as recited in claim 12, wherein:

said rotatable coupler unit includes a rotatable coupler member having an annular rotatable coupler surface;

according to said utilization, said annular rotatable coupler surface is approximately coaxial with and approximately perpendicular to said axis;

according to said utilization, said annular rotatable non-wear surface and said annular rotatable coupler surface approximately face each other; and according to said utilization, said spring-loading means contacts said annular rotatable coupler surface.

16. A mechanical seal assembly as recited in claim 15, wherein:

said rotatable structure describes an approximate ring shape and an approximate sideways U-shaped radial cross-section;

said rotatable coupler member describes an approximate ring shape and an approximate inverted L-shaped radial cross-section;

said rotatable structure includes said annular rotatable non-wear surface on an inside of said sideways U-shape; and said rotatable coupler member includes said annular rotatable coupler surface on an inside of said inverted L-shape.

17. A mechanical seal assembly as recited in claim 15, wherein said stationary structure, said rotatable structure and said rotatable coupler member are each diametrically separable into two approximately equal half-portions.

18. A mechanical seal assembly as recited in claim 15, wherein said rotatable coupler unit includes clamp means for securing said rotatable coupler member with respect to said rotatable shaft, and wherein said rotatable coupler member includes a pair of axial projections for being clamped by said clamp means.

19. A mechanical seal assembly as recited in claim 15, wherein:

said rotatable structure describes an approximate ring shape and an approximate sideways U-shaped radial cross-section, said rotatable structure including an inner circumferential rotatable structure portion, an outer circumferential rotatable structure portion and a radial rotatable structure portion;

according to said utilization, said inner circumferential rotatable structure portion and said outer circumferential rotatable structure portion are approximately coaxial with approximately parallel to said axis and are approximately perpendicular to said radial rotatable structure portion, said radial rotatable structure portion being approximately perpendicular to said axis;

said rotatable coupler member describes an approximate ring shape and an approximate inverted L-shaped radial cross-section, said rotatable coupler member including an outer circumferential coupler member portion and a radial coupler member portion;

according to said utilization, said radial coupler member portion is approximately perpendicular to said axis;

said radial rotatable structure portion includes said annular rotatable non-wear surface on an inside of said sideways U-shape; and said radial coupler member portion includes said annular rotatable coupler surface on an inside of said inverted L-shape.

20. A mechanical seal assembly as recited in claim 19, wherein said radial rotatable structure portion includes a plurality of inner radial slots; wherein said radial coupler member portion includes a plurality of outer radial protrusions for engagement with said inner radial slots; and wherein said capability of said rotatable structure of functioning as a stand-alone element includes the capability of said rotatable structure of permitting said engagement of said outer radial protrusions with said inner radial slots.

21. A mechanical seal assembly as recited in claim 19, wherein:

said stationary structure describes an approximate ring shape and an approximate L-shaped radial cross-section;

said stationary structure includes an inner circumferential stationary structure portion and a radial stationary structure portion;

according to said utilization, said inner circumferential stationary structure portion is approximately parallel to said axis, said radial stationary structure portion being approximately perpendicular to said axis;

said radial stationary structure portion includes said annular stationary non-wear surface; and said inner circumferential stationary structure portion includes said annular stationary wear surface.

22. A mechanical seal assembly as recited in claim 19, wherein said rotatable coupler unit includes clamp means for securing said rotatable coupler member with respect to said rotatable shaft.

23. A mechanical seal assembly as recited in claim 22, wherein said rotatable coupler member includes a pair of axial projections for being clamped by said clamp means.

24. A mechanical seal assembly as recited in claim 12, wherein said reinforced non-polymeric matrix composite material is selected from the group consisting of metal matrix composite and ceramic matrix composite.

25. A mechanical seal assembly as recited in claim 24, wherein said stationary structure and said rotatable structure are each diametrically separable into two approximately equal half-portions.

26. A mechanical seal assembly as recited in claim 12, wherein said spring-loading means includes a plurality of springs, and wherein, according to said utilization, said springs are situated approximately equidistantly about said annular rotatable non-wear surface.

27. A mechanical seal assembly as recited in claim 12, wherein said slidable communication is characterized by self-reparative wear of said reinforced polymeric matrix composite material.

28. A mechanical seal assembly for utilization in association with a stationary housing and a rotatable shaft disposed therethrough, said rotatable shaft having an imaginary axis, said mechanical seal assembly comprising:

a stationary structure having an annular stationary wear surface which is approximately flat;

a rotatable structure having, on opposite sides of said rotatable structure, an annular rotatable wear surface and an annular rotatable non-wear surface, said annular rotatable wear surface being approximately flat;

spring-loading means; and a rotatable coupler unit;

wherein:

said rotatable coupler unit includes a rotatable coupler member having an annular rotatable coupler surface;

said annular rotatable coupler surface is approximately coaxial with and approximately perpendicular to said axis;

said annular rotatable non-wear surface and said annular rotatable coupler surface approximately face each other;

said spring-loading means contacts said annular rotatable coupler surface;

said rotatable structure describes an approximate ring shape and an approximate sideways U-shaped radial cross-section;

said rotatable coupler member describes an approximate ring shape and an approximate inverted L-shaped radial cross-section;

said rotatable structure includes said annular rotatable non-wear surface on an inside of said sideways U-shape;

said rotatable coupler member includes said annular rotatable coupler surface on an inside of said inverted L-shape;

said stationary structure has an annular stationary non-wear surface, said annular stationary non-wear surface and said annular stationary wear surface being on opposite sides of said stationary structure and facing approximately opposite directions;

said housing includes a flange portion having a flange surface;

said rotatable coupler unit includes clamp means for securing said rotatable coupler member with respect to said rotatable shaft; and said rotatable coupler member includes a pair of axial projections for being clamped by said clamp means; and wherein, according to said utilization:

said annular stationary wear surface and said annular rotatable wear surface are approximately coaxial with said axis and approximately perpendicular to said axis;

said annular stationary wear surface and said annular rotatable wear surface are in communication;

said stationary structure is secured with respect to said housing;

said rotatable coupler unit is secured with respect to said rotatable shaft;

said rotatable coupler unit couples said rotatable structure with said rotatable shaft;

said spring-loading means connects said rotatable structure and said rotatable coupler unit so as to contact said annular rotatable non-wear surface and apply an approximately axial force directly against said rotatable structure and toward said stationary structure;

said annular stationary non-wear surface and said flange surface are each approximately coaxial with and approximately perpendicular to said axis; and said stationary structure and said flange portion are fastened to each other so-that said annular stationary non-wear surface and said flange surface are fixedly and adjacently connected.

29. A mechanical seal assembly as recited in claim 28, wherein:

said rotatable structure includes an inner circumferential rotatable structure portion, an outer circumferential rotatable structure portion and a radial rotatable structure portion, and according to said utilization, said inner circumferential rotatable structure portion and said outer circumferential rotatable structure portion are approximately coaxial with approximately parallel to said axis and are approximately perpendicular to said radial rotatable structure portion, said radial rotatable structure portion being approximately perpendicular to said axis.

30. A mechanical seal assembly as recited in claim 28, wherein said rotatable coupler member includes an outer circumferential coupler member portion and a radial coupler member portion which is approximately perpendicular to said axis.

31. A mechanical seal assembly as recited in claim 30, wherein:

said rotatable structure includes an inner circumferential rotatable structure portion, an outer circumferential rotatable structure portion and a radial rotatable structure portion, and according to said utilization, said inner circumferential rotatable structure portion and said outer circumferential rotatable structure portion are approximately coaxial with approximately parallel to said axis and are approximately perpendicular to said radial rotatable structure portion, said radial rotatable structure portion being approximately perpendicular to said axis.

* * * * *